UNITED STATES PATENT OFFICE.

HARRY O. CHUTE, OF CLEVELAND, OHIO.

PROCESS OF PREPARING WOOD-ALCOHOL AND CHLOROFORM.

No. 893,784.     Specification of Letters Patent.     Patented July 21, 1908.

Application filed October 5, 1903. Serial No. 175,726.

*To all whom it may concern:*

Be it known that I, HARRY O. CHUTE, a citizen of the United States, and a resident of Cleveland, in the county of Cuyahoga and State of Ohio, have invented a new and Improved Process of Preparing Wood-Alcohol and Chloroform, of which the following is a full, clear, and exact description.

This invention relates to processes of preparing wood alcohol and chloroform; and comprises a method wherein pure wood or methyl alcohol and chloroform are separated from each other by fractional distillation from a mixture of the same after addition to such mixture of one or more bodies having the property of raising the boiling point of such methyl alcohol and wherein such a mixture is produced by treating ordinary crude wood spirit with reagents adapted to form chloroform therein; all as more fully hereinafter set forth and as claimed.

Ordinary crude wood spirit, or the spirituous product from the destructive distillation of wood and woody fiber, consists essentially of a mixture of methyl alcohol, acetone and other ketones, and other impurities, all admixed with more or less water. Preparation of pure methyl alcohol from this crude wood spirit by the ordinary methods of fractional distillation is a difficult, tedious and expensive operation, the boiling points of the alcohol and of acetone lying not far apart, with those of other ketones and impurities intermediate. For this reason pure acetone-free methyl alcohol is unduly expensive in commerce.

By treatment of wood alcohol with neutral or alkaline hypochlorites, the acetone and some of the other impurities are changed into chloroform, leaving the methyl alcohol unaltered, provided there is no excess of hypochlorite added. This is not in itself a useful reaction, so far as previous knowledge has gone, for it is difficult to separate these bodies by fractional distillation, the boiling point of methyl alcohol, 66° C., not being far from that of chloroform, 61° C.

I have discovered that the addition of water or of soluble or hygroscopic salts, or of both, converts this reaction mixture into one from which the constituents can be easily separated. Water and such salts possess a physical affinity for methyl alcohol and raise its boiling point materially, while having no such effect upon chloroform, chloroform being immiscible with water and dissolving few or none of the ordinary metallic salts. Such an addition of water or soluble salts to the reaction mixture tends to make the chloroform separate physically from the methyl alcohol. While nearly all soluble salts have this effect, the ordinary hygroscopic salts have it in an enhanced degree, nearly all hygroscopic salts being quite soluble in methyl alcohol and its aqueous solutions. Using water alone, I find a useful degree of dilution to be that which will give an apparent alcoholic strength to the reaction mixture of about 50 per cent., although of course a greater or less degree may be employed. A dilution at which the mixture will have such a specific gravity that upon spindling with an ordinary alcohol hydrometer it will show a reading of about 50 per cent. alcohol is well adapted however to the present purposes.

Almost any of the ordinary soluble or hygroscopic salts may be employed; such as, for instance, potassium chlorid, potassium nitrate, potassium acetate, sodium chlorid, sodium nitrate, sodium acetate and similar salts of magnesium, calcium, barium, strontium and zinc. Of these salts, I prefer calcium chlorid as being cheap, effective and easily regenerated. In employing ordinary bleaching powder, or calcium hypochlorite, to form a mixture of methyl alcohol and chloroform from crude wood spirit more or less calcium chlorid is formed in the reaction mixture. Where both water and salts are employed to raise the boiling point of methyl alcohol, the amount of water may be diminished to correspond with the amount of salts present; 5 to 10 per cent. of calcium chlorid, for instance, being used with a solution having an apparent alcoholic tenor of 60 per cent.

In treating wood spirit with hypochlorites, ordinarily I prefer to use the calcium salt, or ordinary bleaching powder, as the cheapest, but other hypochlorites such as those of sodium or potassium, may be employed. It is not necessary that the hypochlorite be preformed since it can be generated in the reaction liquor itself, as by introducing chlorin after making such liquor alkaline. It is important that the hypochlorite shall be present in a neutral or alkaline liquor, as hypochlorites cannot exist in the presence of free acid but evolve chlorin. Chlorin does not form chloroform but produces chlor-acetones, bodies of higher boiling point and piercing odor. The reaction mixture containing the hypochlorite should be heated.

Since wood spirit contains other bodies than acetone capable of reacting with hypochlorites, it is generally desirable only to add the amount of such hypochlorite capable of reacting with such acetone, thereby both economizing hypochlorite and securing purer products. For this purpose advantage may be taken of the weaker affinity of iodin for these other bodies. A measured portion of the wood spirit to be treated may have added to it an amount of potassium iodid more than is equivalent to the amount of acetone likely to be present. Upon now gradually adding a hypochlorite solution of known strength, the iodin and acetone react to form iodoform and at the moment when the acetone all disappears, free iodin will be liberated and may be detected. The amount of hypochlorite necessary to produce this result is the most advantageous amount with which to treat the particular wood spirit under examination. Or, after adding the potassium iodid an excess of hypochlorite may be added and the freed iodin titrated back in the ordinary manner, the amount of such iodin corresponding to the excess of hypochlorite which was employed. Upon adding the determined amount of hypochlorite to a particular sample of wood spirit, the acetone and other chloroform yielding ketones and bodies are converted while the remaining constituents are not acted on to any substantial extent.

Briefly stated, my new process consists in treating wood spirit with a hypochlorite; adding a substance which has sufficient affinity for methyl alcohol to hold it back in distillation and distilling off the chloroform, either while the chloroform-producing reaction is progressing, or later. The chloroform distils over containing but little alcohol and from this small portion it may be separated by addition of water or saline solutions, the aqueous liquid separated being redistilled to regain any chloroform therein contained. After distilling off the chloroform from the original liquid, the methyl alcohol may be distilled over in turn and rectified in any of the well-known ways. It is now free of acetone and similar oxidizable ketonic impurities. A mixture of alcohol and chloroform, such as is produced in treating crude wood spirit with hypochlorite, upon dilution with water or a saline solution containing water yields its chloroform to distillation first and any such mixture may of course be treated by the described process.

As an example of my process in treating wood spirit, I may run, say, 300 gallons of wood spirit into a still of 1,000 gallons capacity. The spirit should preferably show an apparent alcoholic reading of about 95 per cent. on a Tralles alcoholometer. The Tralles scale is designed for grain alcohol but the specific gravities of methyl alcohol and acetone solutions are about the same as those of grain alcohol. The spirit in the still is then heated and a solution or pasty mixture containing the amount of hypochlorite determined in the described manner as required for that particular spirit, is next added. As the reaction of the hypochlorite upon the wood spirit evolves heat, care should be taken to prevent too violent an action, as in this event some of the methyl alcohol might be destroyed. When the action slackens, water is added in amount sufficient to give the liquid an apparent alcoholic strength of about 50 per cent. and heat is applied to distil off the chloroform which has been produced. As long as the distillate upon the addition of water shows the presence of chloroform by forming a heavy underlying layer, the distillate is caught in a special chloroform receiver. When chloroform will no longer separate, the distillation is continued and the distillate received in a tank for purified methyl alcohol.

Having thus described my invention, what I claim is:—

1. The process of purifying wood spirit which consists in treating wood spirit with a hypochlorite to form chloroform from the ketonic impurities, adding a body having sufficient affinity for methyl alcohol to raise its boiling point and distilling off the chloroform.

2. The process of purifying wood spirit which consists in treating wood spirit with a hypochlorite to form chloroform, diluting the reaction mixture with water and distilling off the chloroform.

3. The process of purifying wood spirit and producing chloroform which consists in treating acetone-containing wood spirit with a hypochlorite to form chloroform, diluting the reaction mixture with water and a salt, and distilling off the chloroform.

4. In the process of making pure methyl alcohol and chloroform, the method which consists in adding to a mixture of methyl alcohol and chloroform a body having sufficient affinity for methyl alcohol to raise its boiling point and in then distilling off the chloroform.

5. In the process of purifying methyl alcohol and making chloroform, the method which consists in diluting a mixture of methyl alcohol and chloroform with water and distilling off the chloroform.

6. In the process of purifying methyl alcohol and producing chloroform, the method which consists in diluting a mixture of methyl alcohol and chloroform with water containing a salt and distilling off the chloroform.

In testimony whereof I have signed my name to this specification in the presence of two witnesses.

H. O. CHUTE.

Witnesses:
    H. L. PAYNE,
    W. P. JOHNSON.